(12) United States Patent
Cordiale et al.

(10) Patent No.: US 7,157,815 B2
(45) Date of Patent: Jan. 2, 2007

(54) BRUSHLESS ELECTRIC MOTOR

(75) Inventors: Frank J. Cordiale, Reno, NV (US); Randy Sloan, Reno, NV (US)

(73) Assignee: Dynamic Energy, LLC, Reno, NV (US)

( * ) Notice: Subject to any disclaimer, the term of this patent is extended or adjusted under 35 U.S.C. 154(b) by 102 days.

(21) Appl. No.: 10/773,550

(22) Filed: Feb. 5, 2004

(65) Prior Publication Data

US 2004/0155536 A1     Aug. 12, 2004

Related U.S. Application Data

(63) Continuation-in-part of application No. 09/731,637, filed on Dec. 7, 2000, now Pat. No. 6,700,233.

(51) Int. Cl.
*H02K 7/06* (2006.01)
*H02K 33/00* (2006.01)
*H02K 35/00* (2006.01)

(52) U.S. Cl. .......................... 310/24; 310/34
(58) Field of Classification Search .................. 310/23, 310/24, 30, 33, 34
See application file for complete search history.

(56) References Cited

U.S. PATENT DOCUMENTS

| | | | | |
|---|---|---|---|---|
| 1,885,662 A | * | 11/1932 | Whitehorn | ............... 104/138.1 |
| 3,037,462 A | * | 6/1962 | Barry | ........................... 104/18 |
| 3,889,528 A | * | 6/1975 | Grikscheit et al. | ......... 73/119 R |
| 4,510,420 A | * | 4/1985 | Sasso | ........................... 318/37 |
| 4,762,096 A | * | 8/1988 | Kamm et al. | ............. 123/90.16 |
| 5,457,349 A | * | 10/1995 | Gifford | ........................ 310/24 |
| 5,903,069 A | * | 5/1999 | Hiterer | ........................ 310/15 |
| 6,502,494 B1 | * | 2/2003 | Marshall | ........................... 89/8 |
| 6,812,661 B1 | * | 11/2004 | Maslov et al. | .............. 318/268 |
| 6,853,107 B1 | * | 2/2005 | Pyntikov et al. | ............. 310/184 |

\* cited by examiner

*Primary Examiner*—Karl Tamai
*Assistant Examiner*—David W. Scheuermann
(74) *Attorney, Agent, or Firm*—John D. Long (57) ABSTRACT

A solenoid-based propulsion system and methodology comprised of at least one multiple wire coil set solenoid that reversibly receives at least a portion of a magnetic object, wherein the wire coil sets of the solenoid are connected to the energizing control system that controls the alternate energizing of the wire coil sets; the adjustable dwell angle of the energizing; and provides for skip energizing. The electronic format of the energizing control system utilizes an electronic timer to establish the frequency at which the alternate energization occurs to propel the magnetic object in a reciprocal motion. The energizing control system in a payload delivery system embodiment of the invention helps converts the kinetic energy stored in the reciprocal motion of the magnetic object into a movement propelling the magnetic object completely and unilaterally out of the invention.

16 Claims, 6 Drawing Sheets

BRUSHLESS ELECTRIC MOTOR

CROSS-REFERENCES TO RELATED APPLICATIONS

This is a Continuation-in-Part Application of parent application Ser. No. 09/731,637, filed Dec. 7, 2000 now U.S. Pat. No. 6,700,233.

STATEMENT REGARDING FEDERALLY SPONSORED RESEARCH OR DEVELOPMENT

Not Applicable

REFERENCE TO A "MICROFICHE APPENDIX"

Not Applicable.

BACKGROUND

1. Field of the Invention

The present invention relates to the field of electromagnetic-based propulsion apparatus and methodology, namely solenoid-based propulsion apparatus and methodology.

2. Description of the Related Art

For well over a century and half, electrical current and magnetic fields/forces have known to possess a corresponding relationship that can be described and predicted through mathematical formulae. One-half of this relationship is observed when the movement of electricity, electrical current, through a wire correspondingly creates a magnetic force or field around the wire. This half of the relationship or principle is the basis for the operation of many types of electric motors, pumps, etc. Conversely, the other half of the relationship is observed when the movement of a magnetic force or field over a wire correspondingly creates electrical current in that wire. This half of the principle forms the basis for the operation of many types of electrical generators and alternators. In both halves of the relationship, the strengths and properties of two fields are proportional to one another With this understanding, various applications have been developed using electrical/magnetic forces to create various propulsion systems and methodologies for solenoid/inducer-based power trains or power apparatuses. The basic definition of a solenoid is a cylindrical coil of wire which creates a magnetic field within itself when an electric current passes through it to draw a core of iron or steel within the coil. The solenoid generally uses electrically conductive, non-magnetic and insulated wire of specific length that is coiled or wrapped around a tube or hollow cylinder. The core, in general terms, is a magnetic object, a portion of which moves in at least a portion of the tube's interior. The passing of an electrical current through the wire coiled around the tube generates a corresponding magnetic field or force around the tube/wire coil. This effect, commonly known as the ElectroMotive Force (EMF), denotes that the polarity and strength of the electrical current passing through the wire coil will correspondingly determine the polarity and strength of the resulting magnetic field or force. In this manner, the manipulation of the various attributes of the electrical current (e.g., polarity, duration and strength, etc.) respectively controls the attributes of the resulting magnetic field and the movement of the magnetic object in relation to the magnetic field. In controlling the electrical current to the solenoid or inducer, the subsequently created magnetic field draws, holds or expels the magnetic or polar object in relation to the interior of the wire wrapped tube.

For the magnetic force to be able act upon an object, the object generally is required to be magnetic: e.g., have those properties that are responsive to magnetic forces or fields. The incorporation of ferromagnetic material, such as an iron-based alloy, can also provide these magnetic/polar properties. The object can also obtain these properties through the incorporation of a wire coil set that can be energized to create an electromagnetic field or force.

Correspondingly, when current in the coil moves the magnetic material, the movement of the magnetic material proximate to the coil will create a current in the wire. That magnetic material creates a current that opposes or counters the original current flowing through the wire and is therefore referred to a counter or back Electromotive Force (e.g., CEMF).

Examples of prior art the solenoid-based electric motor are those taught by U.S. Pat. No. 1,886,0404 issued to Moodyman on Nov. 1, 1932; U.S. patent issued to Reynolds on Jun. 7, 1988; U.S. Pat. No. 4,631,455 issued to Tashoff on Dec. 23, 1986. This prior art has a structure and operation analogous to the internal combustion engine or "ICE". The ICE converts the chemical energy of fuel-air based combustion into mechanical energy of reciprocally moving pistons in combustion cylinders that rotate a crankshaft. The prior art replaces both the combustion cylinders with electrical solenoids and the propulsion of fuel-air based combustion with the propulsion of EMF power. The prior art, in lacking air-fuel combustion propulsion, also dispenses with the mechanics of such propulsion, namely: required tight seals between piston and cylinder walls; greater energy to move the tight-fitting pistons; increased wear due to tight-fitting pistons; additional lubrication means for tight-fitting pistons; high temperatures/pressures associated with combustion; engine composition limited to materials that are able to withstand high operation temperatures/pressures; and additional mechanical apparatuses required to control intake of air/fuel and outtake of exhaust from cylinders.

The prior art solenoid electric motors use solenoids that have either a single or multiple wire coil sets. For example, U.S. Pat. No. 5,592,036 issued to Pino teaches a solenoid electric motor with a single wire coil set which relies upon gravity (e.g. "a gravity drop") to pull at least a portion of a magnetic piston away from a de-energized wire coil set to reset the motor's operation cycle. Additionally, the momentum from the moving mass of a crankshaft/flywheel that is movably connected to the magnetic piston aids in the withdrawal of that magnetic piston from the de-energized wire coil set.

Prior art motors that use multiple wire coil set solenoids do not have to rely upon a gravity drop. Instead, one energized wire coil set propels the magnetic object towards it while simultaneously withdrawing the magnetic object from a de-energized wire coil set.

Another prior art application is the solenoid-based pump. One prior art embodiment uses a series of solenoids fitted around the circumference of a toroidal or donut-shaped tube to magnetically propel one or more magnetic pistons in one direction within the interior of the toroidal tube. To handle the flow of gas/liquids, the pump is fitted with at least two one-way valves (e.g., chuck valves): an inlet valve and an outlet valve. As the magnetic piston(s) circulates through the tube as propelled by the solenoid(s), the suction of a passing magnetic piston draws in the external gas or liquid (or both) through the inlet valve. Alternatively, the pressure built up in front of an approaching magnetic piston the outlet valve propels gas or liquid (or both) out of the pump through the outlet valve. As the solenoid(s) continuously and circuitously propels the magnetic piston(s) throughout the interior of the circular tube, the pump continuously draws in liquid/gas at one point and propels it out at another.

Another embodiment of the prior art solenoid pump is where the solenoids reciprocally move a single magnetic piston contained within a non-toroidal, enclosed tube or hollow cylinder. In one embodiment, the inlet and outlet valves are both located at one end of the tube. The magnetic piston moving from the valve end draws in liquid/gas from the outside environment while returning motion pushes the gas/liquid back out of the pump.

Another example of the solenoid pump prior art has the inlet valve located at one end of the pump and the outlet valve at other. As a magnetic piston draws away from the inlet valve end, the resulting suction draws the gas/liquid into the pump through the inlet valve. When the magnetic piston reciprocates and travels back toward the inlet valve end, the magnetic piston has a "loose enough" fit to the tube interior to allow the accumulated gas/liquid to pass around the exterior of the magnetic piston. As the magnetic piston moves again towards the outlet valve end, the gas/liquid in front of the magnetic piston creates the pressure that opens the outlet valve to expel the accumulated gas/liquid from the pump.

A modification of this reciprocal piston pump is U.S. Pat. No. 4,389,169 issued to De Dionigi on Jun. 21, 1983, which does not have a magnetic piston with a "loose enough" fit to the tube interior to allow accumulated intake gas/liquid to pass around its exterior. Instead, the magnetic piston has a third one-way or chuck valve that traverses the longitudinal axis of the magnetic piston itself. As the magnetic piston travels forward from the intake valve, the third one-way valve is shut so the magnetic piston pushes any liquid/gas in front of it to the outlet valve while at the same time creating suction behind the magnetic piston to draw liquid/gas through the inlet valve. When the magnetic piston then is propelled back towards the inlet valve, the magnetic piston's one-way valve opens to allow the previously dawn in gas/liquid behind it to pass through to the magnetic piston's front. When the operation cycle begins again, the magnetic piston's one-way valve closes so that magnetic piston pushes the liquid/gas in front of it towards the outlet valve and expels it out of the pump.

The solenoid prior art has several limitations as seen in U.S. Pat. No. 4,684,834 issued to Hartman, Sr. on Aug. 4, 1987; U.S. Pat. No. 4,019,103 issued to Davis on Apr. 19, 1977; and U.S. Pat. No. 5,457,349 issued to Gifford on Oct. 10, 1995 which uses proximity detection methodology to sense the piston's position relative to the wire coil set in order to ensure that the wire coil set is energized/de-energized at the proper time during the sequence of an operation cycle. In using electrical contacts in such means, arcing resulting from resistance at speed can cause misfire/mis-energizing or otherwise impair the device's operations. Further, mechanical energizing/proximity detection means have other limitations which can impede the device from reaching it fastest/optimal operating speed.

Another issue for the proper operation of solenoid-based devices may be the variable control of the time duration for the energizing of the individual wire coils sets. This variable control may be used to adjust the length of time that electricity passes through a particular wire coil (e.g., duration of the energizing for a wire coil) and may be used to prevent a significant increase in an electrical current giving way to resulting resistance and corresponding energy loss e.g., mechanical, magnetic and electrical).

The prior art also does not make mention of or use "skip" energizing or shutting down electrical power momentarily to specific wire coil sets during specific energizing times to allow the momentum of the moving parts of a solenoid motor to continue the operation. This skip energizing allows the operator to reduce the amount of external electricity/energy needed to run the motor.

Another limitation of the prior art is the tendency to follow the physical set-up of a reciprocal piston ICE and to incorporate the inefficient original ICE firing order for energizing the solenoid(s)/propulsion of the piston(s). The ICE, which have to perform a compression stroke to prepare the cylinder/piston for the combustion of the fuel air mixture, commonly have only one or two pistons combustion propelled at a time which are dragged down by having to move the remaining non-propelled pistons through portions of their operation cycles.

Further, much of the solenoid prior art does not take advantage of the fact that the compression stroke can be eliminated to allow a magnetic piston to be propelled twice by the multiple wire coil sets of the solenoid in one stroke/cycle (i.e., one full reciprocal piston movement of the piston). This dual energizing per cycle/stroke provides for the multiple and simultaneous energizing of multiple pistons of the device to eliminate piston drag and increased the power output of the device.

What is needed therefore is a solenoid/inducer-based propulsion system and methodology which provides for efficient energizing of the wire coil sets of the solenoid-based devices.

SUMMARY OF THE INVENTION

This invention is an apparatus and methodology for solenoid or inducer-based propulsion system and methodology which provides for individualized dwell angle controls for respective energizing of wire coil set(s); "skip" energizing; and an electronic timer driven energizing of the solenoid wire coil sets.

The invention is comprised of one or more multiple wire coil set solenoids/inducers, each of which is wrapped around a hollow cylinder or tube with an interior and exterior, the interior reversibly receives at least a portion of a magnetic object (i.e. magnetic piston or payload). In the motor embodiment of the invention, at least one open end connects the interior and exterior of the tube. Additionally, a conversion mechanism movably connected to the magnetic piston(s) translates the reciprocal motion of the piston into rotational power. In the pump and payload delivery embodiments, the magnetic piston(s)/payload can be free standing, unconnected to a conversion mechanism. The multiple wire coil set solenoid(s) is comprised of plurality of wire coil sets mounted upon a hollow cylinder/tube that uses magnetic fields/forces created by the unilaterally or unipolar energized a number of wire coil sets to reciprocally propel magnetic piston(s)/payload(s) in at least a portion of the tube interior.

The invention is further comprised of an energizing control system that provides and coordinates both the energizing and the duration (dwell angle) of energizing of a solenoid(s)'s multiple wire coil sets. The energizing control system has two versions: a mechanical proximity detection/energizing means and an electronic energizing apparatus. The energizing apparatus comes in two electronic formats: proximity detection and electronic timing. All versions (mechanical and electronic) of the energizing control system provide for individual dwell angle control for the solenoid(s)'s wire coil sets.

The mechanical proximity detection/energizing means utilizes two sets of power brush pairs making electrical connection with a metal strip on a circumference of a flywheel powered by the invention to control both the energizing and the dwell angle of the wire coil sets The energizing apparatus does not rely on mechanical means such as power brushes making mechanical/electrical contact with a metal strip. Instead, the energizing apparatus uses electronic circuitry for controlling the energizing of the wire coil sets. In first or proximity detection format of the energizing apparatus uses three electronic sub-circuits: an external energy sub-circuit; a proximity detection sub-circuit; and a wire coil set energizing sub-circuit. The external energy sub-circuit supplies electrical current for powering the two other sub-circuits. The proximity detection sub-circuit detects the position of the payload(s)/piston(s) relative to its respective wire coil sets to activate/deactivate the wire coil set energizing sub-circuit. The wire coil set energizing sub-circuit in turns energizes/de-energizes the respective wire coil set(s).

The second or electronic timing circuitry for the energizing apparatus utilizes, in place of the proximity detection sub-circuit, an electronic timer, the variable speed timing sub-circuit, to drive the wire coil set energizing sub-circuit (s). The variable speed timing sub-circuit does not use proximity detection of the magnetic object's position; rather the sub-circuit forces the magnetic object to respond to alternate energizing of the wire coil sets. To aid in this method of operation, the solenoid has centering magnets placed in at the center point of the magnetic object's travel within the solenoid. These centering magnets locate the magnetic object within the center point during the startup of operations. Failure to have the magnetic object so centrally located will prevent the magnetic object from properly responding to the magnetic fields of the alternately energized wire coil sets.

The energizing apparatus also utilizes the Counter ElectroMotive Force (CEMF) (magnetically created electricity or a voltage spike). The energizing apparatus diverts the CEMF to prevent damage to the invention's integrated circuitry and to supplant at least portion of the power of external energy sub-circuit.

Alternate embodiments of the energizing apparatus utilize audio wave generation, the means by which stereo sound amplifiers work, to use varying voltage levels of the electrical current to energize the wire coils sets of the multiple wire coil set solenoid(s).

Additional embodiments of the energizing apparatus provide for "skip" energizing, the selective energizing of the wire coil sets when the invention is operating at speed. Skip energizing reduces the invention's external energy requirement during operations to make the invention more energy efficient.

Another feature of the present invention is at least one propulsion magnet adjustably positioned in relation to the invention, so as not to be in direct contact with either the multiple wire coil set solenoid or the magnetic object. The propulsion magnet(s) greatly enhances the operation cycle and/or power output of the invention. While not affecting the patentability of the invention, it is the belief of the inventor that the propulsion magnet acts to enhance the magnetic fields/forces generated by the solenoid(s) during operation.

The invention with its enhancements over the prior art can be used as a variety of solenoid propulsion systems and methodologies including, but not limited to, a motor, pump, and payload delivery system.

It is therefore an object of the invention to limit the power loss in solenoid/inducer-based propulsion systems caused by mutual dwell angles.

It is another object of the invention to provide a more energy efficient solenoid/inducer-based propulsion system and methodology.

It is a further object of the invention to utilize propulsion magnets to significantly enhance the speed and power output of solenoid/inducer-based propulsion system and methodology.

It is another object of the invention to provide a solenoid/inducer-based reciprocal propulsion system for payload delivery.

It is a further object of the invention to lower energy loss and increase control in solenoid/inducer-based propulsion systems.

It is another object of the invention to reduce the need for gravity and/or momentum to provide a reciprocal force to remove the piston/payload from the non-energized portion of the solenoid.

It is a further object of the invention to provide a solenoid propulsion system and apparatus powered by low electrical power.

DESCRIPTION OF THE NUMERICAL LISTING

1 invention
10 reciprocal piston solenoid motor
11 framework
12 payload
13 energizing control system
14 magnetic object
20 multiple wire coil set solenoid
21 piston
22 wire coil set
23 tube
24 spool
25 open end
26 tube interior
27 insulated collar
28 tube's lateral cross section
29 terminal
30 positive end 31 ground end
32 wire
40 conversion mechanism
41 connecting rod
42 crankshaft
43 flywheel
44 metal strip
45 power brush pair
46 positive energizing brush
47 power source brush
48 insulated circular plate
49 mirror/polished portion
50 energizing apparatus
51 external power sub-circuit
52 variable AC transformer
53 bridge rectifier
54 fuse/circuit breaker
55 capacitor
56 resistor
57 $2^{nd}$ capacitor
58 Zener diode
60 wire coil set energizing sub-circuit
61 Darlington array
62 optic isolator
63 Counter EMF connection
64 diode
70 proximity detection sub-circuit
71 optical sensor switch
72 Hex Schmidt inverter
80 variable speed timing sub-circuit
81 astable 555 integrated circuit
82 monostable 555 integrated circuit
83 flip-flop integrated circuit
84 AND gate integrated circuit
85 amplifier
86 adjustable resistor
88 centering magnets
90 propulsion magnets
91 bolt
100 solenoid pump
120 payload delivery system
121 breach
122 muzzle
123 spring

DETAILED DESCRIPTION OF THE PREFERRED EMBODIMENTS

The present invention, generally denoted by numeral 1, is an apparatus and methodology for a multiple wire coil set solenoid/inducer-based propulsion system and methodology.

Figure 1:
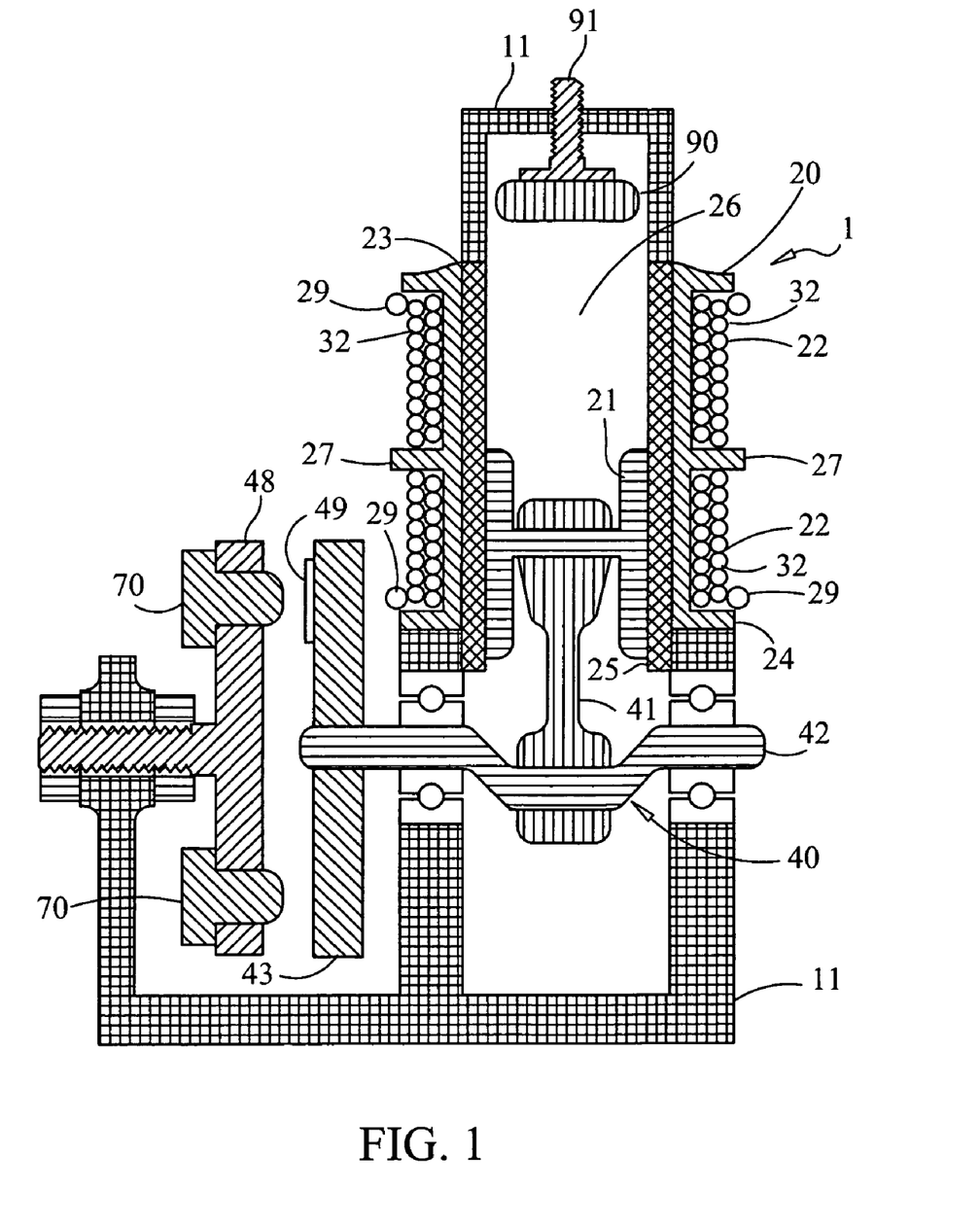
FIG. 1 A side elevation cutaway drawing of the solenoid motor embodiment of the invention utilizing the proximity detection format of the energizing apparatus.
Figure 2:
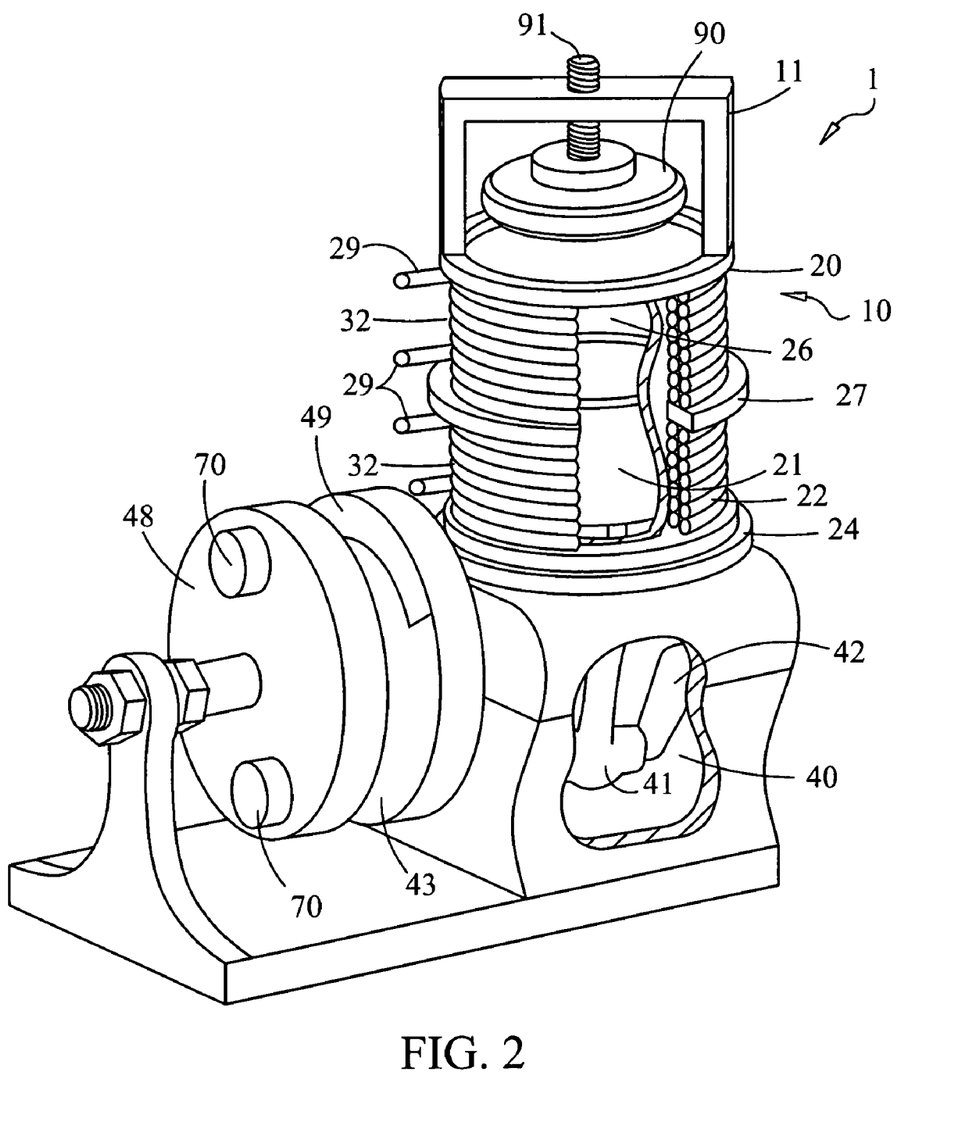
FIG. 2 A perspective cutaway drawing of the solenoid motor embodiment of the invention utilizing the electronic proximity detection format of the energizing apparatus.
Figure 3:
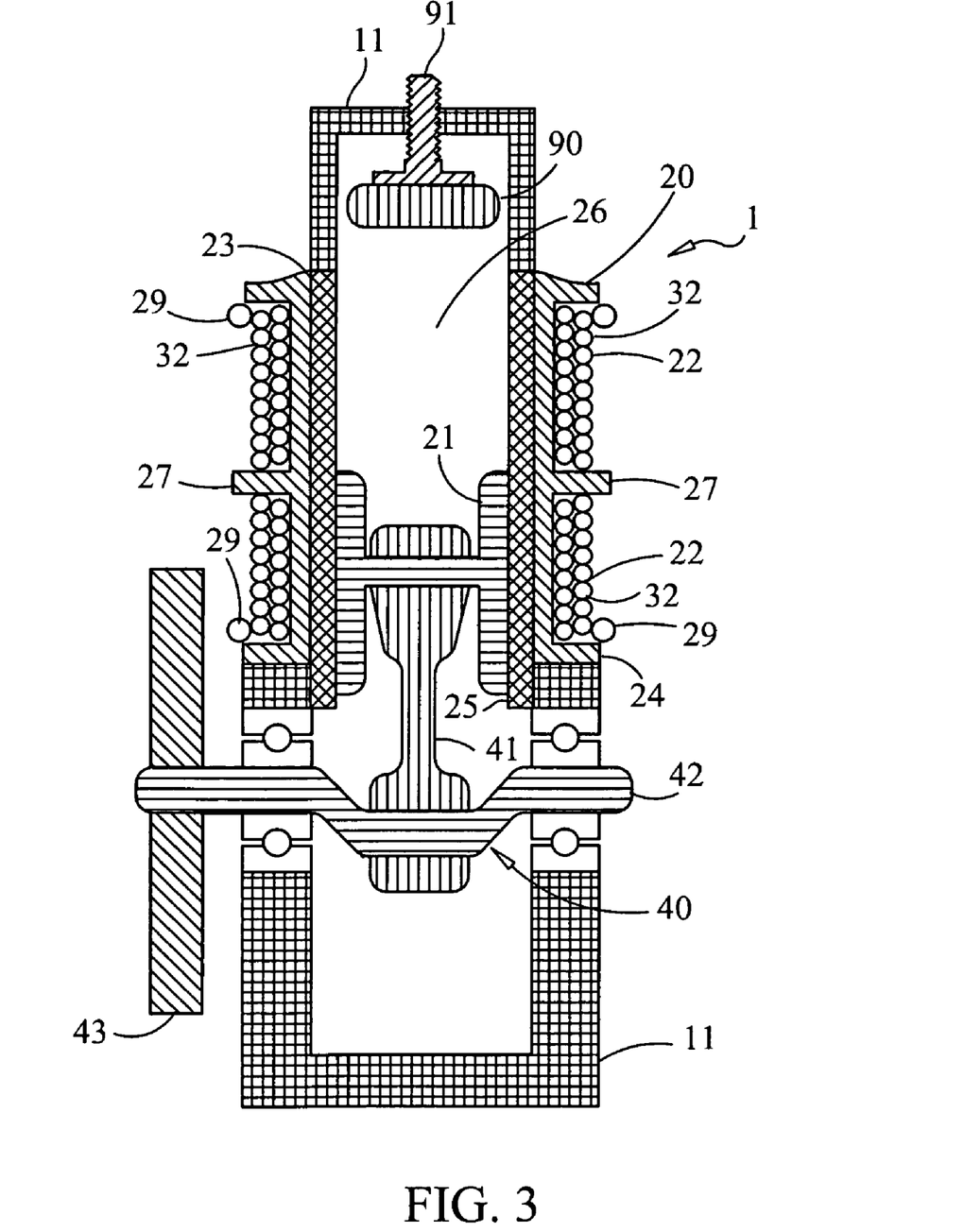
FIG. 3 A side elevation cutaway drawing of the solenoid motor embodiment of the invention utilizing the electronic timer format of the energizing apparatus.

As shown in FIGS. 1, 2 and 3, the preferred motor/engine embodiment of the invention 1 is a reciprocal piston motor driven by multiple wire coil set solenoid(s), generally referenced by numeral 10. The invention 1 is comprised of: 1) a framework 11 holding at least one multiple wire coil set solenoid/inducer 20 which reversibly receives at least a portion of a magnetic object 14, 2) a piston(s) 21 or payload 12; 3) a conversion mechanism, generally referred to by numeral 40, moveably connected to the piston 21 to translate the piston's reciprocal movement into rotational power; and 4) an energizing control system, generally referenced by numeral 13, that controls the energizing of the multiple wire coil sets 22.

The multiple wire coil set solenoid/inducer 20 is formed from at least two wire coil sets 22 wrapped directly around a hollow cylinder or tube 23. Alternately, the wire coil sets 22 are wrapped around a spool 24 that reversibly slips over the tube 23 for easy removal should the wires 31 of a wire coil set 22 burn out. The tube 23 in the preferred motor/engine embodiment of the invention 1 has at least one open end 25 that connects a tube exterior and tube interior 26. At least a portion of the tube interior 26 to the tube exterior, at least a portion of which can reversibly and freely (i.e., slip fit) receive at least a portion of a piston 21. Alternatively, the tube 23 could have two open ends to permit the interior of the invention 1 containing the tube interior 26, the piston 21 and the conversion mechanism 40 connected to the piston 21 to be fully vented to the outside atmosphere.

The tube 23 and spool 24 are constructed from lightweight, non-magnetic, material such a high temperature polymer or carbon fiber, although other non-magnetic materials like aluminum could be used. The tube 23 or spool 24 can alternatively be further defined by having an insulated collar 27 or radial divider wrapped around the tube's outside lateral center to separate the wire coil sets 22.

In the preferred embodiment, the piston 21 is magnetic and would preferably have a cylindrical or spherical shape with dimensions providing the piston 21 with a slip fit within the tube interior 26. The piston 21 becomes magnetic through the incorporation of some type of ferromagnetic material, such as an iron-based alloy, via methodologies known to those skilled in the art. An alternate means to impart magnetic/polar properties include, but are not limited to, having the piston 21 incorporate a wire coil set that when energized, creates the piston's own EMF magnetic field/force (e.g., a solenoid inside a solenoid).

In addition to a slip fit, the construction of the piston 21 could allow any gases or liquids found in the interior of the invention to have free passage of through or around the piston 21. Constructing the piston 21 to be hollow with two open ends would further augment the free passage.

Because sealing fit between the piston 21 and tube interior 26 is not necessary for the operation of the invention 1, the fit, design, shape and size of both the piston 21 and the tube 23 are primarily limited by the ability of at least a portion of the piston 21 to move back and forth freely with little or no friction (slip fit) within at least a portion of the tube's interior 26. Freed of such needs, the alternate embodiments of the lateral cross-sections for both the tube 23 and piston 21 could be other than circular. It is also possible for the tube 23 and piston 21 to each have differently shaped lateral cross-sections so long as the slip fit occurred and that there was no significant changes in the electromotive force (EMF) of the wire coils sets 22 and magnetic force/field of the piston 21 to impair the operation of the invention 1.

In alternate embodiments, air/liquid tight compartments contain the invention's electrical components (i.e., the wire coil sets 22 and energizing control system 13). Additionally, the construction of both the sealed compartments and the electrical components provide that the insides of the sealed compartments are solid (without air or vacuum). This solidity would allow the invention 1 to withstand a wide range of pressures from the external environment and otherwise constructed in methods known to those skilled in the art. This construction, in combination with an otherwise vented interior, allows the invention 1 to operate in extreme pressure environments such as deep sea, Jupiter/Venus planetary conditions without having to resort to the additional engineering, expensive construction, and/or special materials needed to make the invention 1 extremely strong to withstand a high pressure differential. Further, the invention 1 having the electrical components in sealed electrical compartments could operate efficiently and safely in liquids/gases that have characteristics which can cause operational interruption or the spontaneous and instantaneous disassembly (i.e., explosion) of invention 1.

The preferred embodiment of the invention 1 uses one or more multiple wire coil set solenoids 20 that are comprised of at least two coiled wire sets 22 made of electrically conductive, non-magnetic wire 32 with nonconductive, insulated coating or surface; a non-magnetic hollow cylinder or tube 23; and a magnetic piston 21. The wire 32 is made of a non-magnetic electrically conductive material such as copper. As stated above, the wire 32 is wrapped either upon the tube 23 or upon a spool 24 that is reversibly slip fitted upon the tube 23.

In the preferred embodiment, the wire 32 of each wire coil set 22 is wrapped in the opposite directions of the wire 32 in the other wire coil set 22 (e.g., one wire coil set 22 would be wrapped clockwise, while the other wire coil set 22 would be wrapped counterclockwise). In accordance with the needs of a particular embodiment, mathematical formulae as known to those skilled in the art, would dictate the type, length, diameter of wire and number of wire coils used to form a wire coil set 22.

In the preferred embodiment, each wire coil set 22 has two terminals 29, a positive end 30 and ground end 31, through which electrical power respectively enters and exits the wire coil set 22. One wire coil set 22 is located near each end of the tube 23 and covers respectively half of the exterior of the tube 23. The wire coil sets 22, except where separated by the insulated collar 27 generally cover the entire length of tube 23. Alternate embodiments of the invention 1 have the wire coil sets 22 covering only a portion of the tube 23.

The invention 1 is constructed with one or more multiple wire coil set solenoids 20. The multi solenoid embodiment of the invention 1 are structurally composed like its ICE counterparts with multiple wire coil set solenoids 20 arranged in banks (straight in-line, X-orientation, V-line, opposing, etc), radial format and the like. However, the energizing control system 13 does not follow the inefficient firing/energizing order of their ICE counterparts and therefore can provide simultaneous activation of all or most of their solenoids/pistons for greater propulsion/power output. The invention 1 energizes/propels the piston(s) 21 twice during a cycle/stroke (one full reciprocal movement of the piston) to eliminate the drag caused by non-magnetically propelled pistons and increase the power output and efficiency.

The conversion mechanism 40 translates the piston's reciprocal movement into rotational power. The conversion mechanism 40 is comprised of a connecting rod 41, crankshaft 42, and a flywheel 43. The connecting rod 41 has one end movably connected to the piston 21 and has the other end moveably connected to crankshaft 42. The framework 11 moveably holds the crankshaft 42 for the free rotation. The crankshaft also has the flywheel 43 attached to one of its ends. If so desired, the crankshaft 42 and the flywheel 43 may be constructed with sufficient mass so that the rotational momentum of crankshaft 42/flywheel 43 aids the reciprocal movement of the piston 21 away from a de-energized wire coil set 22 during the piston's operation cycle.

In order to ensure the crankshaft 42, hence the invention 1, turns over in a desired direction on start up, one or more cam or roller clutches, essentially unidirectional ball bearings, can be fitted to where the crankshaft 42 movably meets the framework 11. The selection and installation of the cam clutches for the invention 1 is within the knowledge of those skilled in the art.

The energizing control system 13 of the invention 1 has two embodiments or version: an energizing apparatus, generally denoted by the numeral 50, and a mechanical detection/energizing means.

The mechanical detection/energizing means is comprised of a power source, power brushes 45 and a metal strip 44 attached to the flywheel 43. The metal strip 44 is insulatedly attached to approximately one quarter of the circumference of the side/edge of the flywheel 43. The length of the metal strip 44 determines the maximum dwell angle or the maximum fixed duration of time that a particular coil wire set(s) 22 can be energized during the operation cycle of the invention 1 (e.g. one rotation of the flywheel 43/one full reciprocal movement of the piston 21).

The multiple pairs of power brushes 45 or connectors, one pair for each wire coil set 22 of a multiple wire coil set solenoid 20 provides the electrical connection between the wire coil sets 22 and the mechanical detection/energizing means 5. Example, if the invention 1 uses several solenoids, each having two wire coil sets 22 apiece, then there will be two sets of power brush pairs 45 to control all the energizing of all the wire coil sets 22.

Each pair of power brushes 45 has a positive energizing brush 46 electrically connected to the positive end 30 of respective wire coil set(s) 22 and a power source brush 47 electrically connected to power or positive output of the power source. The positive energizing brush 46 insulated from the power source brush 47 to prevent direct electrical contact between two brushes. The negative end 30 of the wire coil set 22 connects to the ground of the power source. In order to minimize the occurrence of unwanted arcing or back flowing of current between the brushes of the power brush pairs 45 and the metal strip 44, a capacitor attaches in parallel, or a diode attaches in series, or both, to the power brush pair(s) 45.

When a power brush pair 45 encounters the metal strip 44 during the rotation of the flywheel 43, the electrical current from the power source brush 47 flows through the metal strip 43 to the positive energizing brush 46 and onto the power brush pair's respective wire coil set(s) 22. This action causes the energizing of the respective wire coil set 22 and creates the magnetic field which pulls the piston 21 towards it. As this occurs, the piston 21, through the conversion mechanism 40, turns the flywheel 43 which moves the metal strip 44 away from the power brush pair 45. This breaks the electrical contact and de-energizing the respective wire coil set 22 as the piston 21 reaches its zenith of movement in regards to that particular wire coil set 22.

To accomplish this timed energizing, the two power brush pairs 45 are located on an insulated circular plate 48 that has the same diameter as the flywheel 42. The two power brush pairs 44 are generally located 180° degrees apart from one another near the edge of the insulated circular plate 47. Using means known to those versed in the art, the two power brush pairs 45 can be movably affixed to the insulated circular plate 48 so that the distance between the individual brushes (the positive power brush 46 and the power source brush 47) can be individually adjusted to set the dwell angle for each power brush pair 45 and their respective wire coil set(s) 22.

The insulated circular plate 47, which is movably mounted on the framework 11, allows the operator can rotate the insulated circular plate 47 around its center. The insulated circular plate 47 is planarly located near the flywheel 42 with the centers of the flywheel 42 and the insulated circular plate 47 both having the same axis. Accordingly, the two power brush pairs 45 are placed on the insulated circular plate 47 so they face the side of the flywheel 42 containing the metal strip 43. The insulated circular plate 47 is manually turned and then locked so that orientation of the power brush pairs 45 relative to the metal strip 44 presents the most efficient timing for the energizing of the wire coil sets 22 relative to the movement of the piston(s) 21.

As stated above, the length of the metal strip 44 establishes the maximum time duration/dwell angle for the energizing of a particular wire coil set(s) 22. The time duration/dwell angle adjusted for a shorter duration by mechanically changing the distance between the brushes of a respective power brush pair 45. For example, if one power brush pair 45 had its two brushes adjusted to be about the same distance apart as the distance of the metal strip 44, the energizing time duration or dwell angle would be very small. At such a setting, only the tips of the front and back portions of the metal strip 44 would make simultaneous electrical contact with the two brushes of a power brush pair 45 for a very brief period during operations before moving slightly and breaking contact with one of the brushes. If, on the other hand, the brushes of a power brush pair 45 were adjusted to be very close together (maximum dwell angle) then as the flywheel 43 rotates, the two brushes would have a much longer simultaneous electrical contact with metal strip 44. This adjustment would provide for a greater time duration/dwell angle during which some portion of the metal strip 44 was providing simultaneous electrical contact with both brushes of a power brush pair 45.

Figure 4:
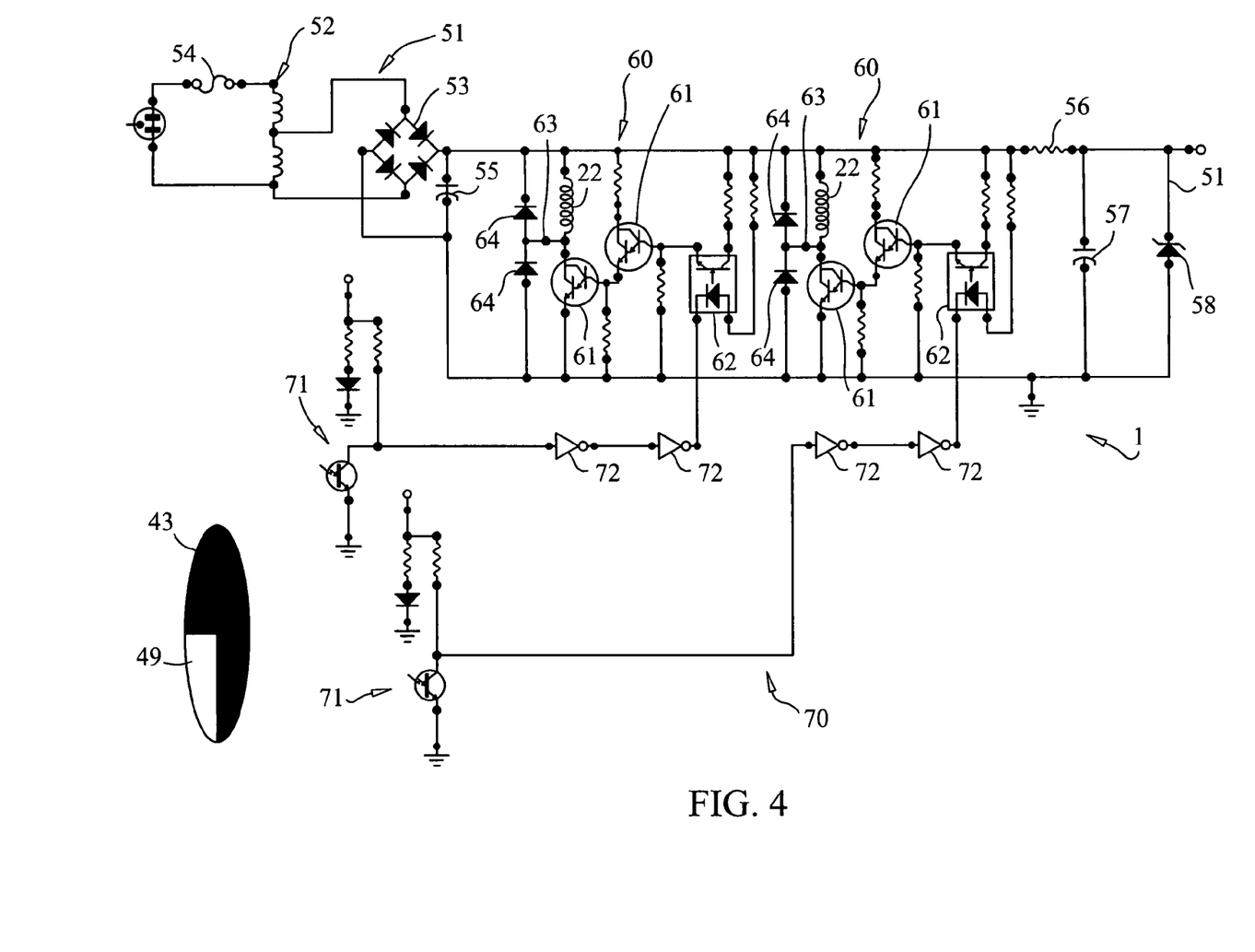
FIG. 4 A circuitry diagram for proximity detection format of the energizing apparatus.
Figure 5:
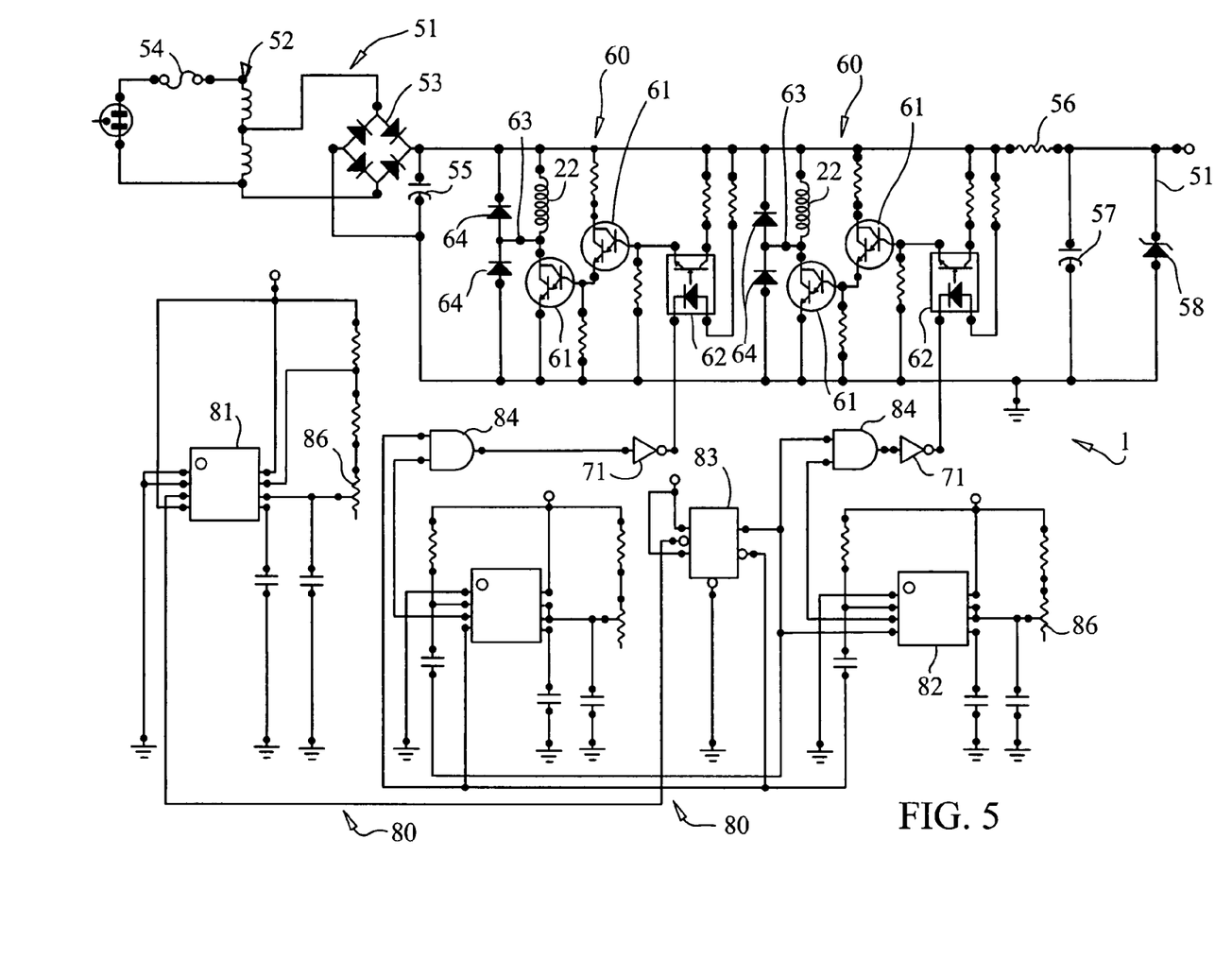
FIG. 5 A circuitry diagram for electronic timer format of the energizing apparatus.

As shown in FIGS. 4 and 5, the energizing apparatus 50 has two formats: the proximity detection format and the electronic timer format. The proximity detection format utilizes an external power sub-circuit 51, a proximity detection sub-circuit 70 and a wire coil set energizing sub-circuit 60 which is controlled by the proximity detection sub-circuit 70. The proximity detection sub-circuit 70 replaces the power brush sets 45 of the mechanical detection/energizing means with optical sensor switches 71 and replaces the metal strip 44 with a polished/reflective portion 49 of the flywheel 43.

The flywheel 43, in addition to the polished/reflective portion 49, has the remaining portions of its surface dyed or otherwise darkened to absorb any light that could possibly cause a out of sequence activation of the optical sensor switches 71.

The optical sensor switches 71 are phototransistors, photosensitive solid-state circuitry devices which allow the passage of electricity through the device in the presence of light. The optical sensor switches 71 also have a LED (Light Emitting Diode) to provide the activating light for the phototransistor. The optical sensor switches 71 are encased to prevent unwanted lighting from causing an out of sequence energizing of the wire coil sets(s) 22. In alternate embodiments of the invention 1, the optical sensor switches 71 can be other suitable electronic proximity detection means known to those skilled in the art.

The insulated circular plate 48 has similarly mounted optical sensor switches 71 so that light of the LED(s) reflecting off the mirror polished portion 49 of the flywheel 43 activates the optical sensor switches 71. The operator first turns then locks the insulated circular plate 48 to position it and the optical sensor switches 71 properly, thus ensuring the correct timing for the energizing of the wire coil sets 22. In this manner, the proximity detection sub-circuit 70 determines the position(s) of the various piston(s) 21 relative to their respective control wire coil set(s) 22.

Another embodiment of the invention 1 has the optical sensor switches 71 placed so that they act directly on the piston(s) 21 themselves. In this embodiment, the phototransistor and LED light source has access to the tube interior 26 by means of either the use of translucent material in the tube 23 or through an opening to the tube interior 26. This tube construction allows the optical sensor switch 71 to be triggered when a mirror/polished portion of the piston 21 reflects the LED light activating the optical sensor switch 71.

A Variable Alternating Current ("VAC") transformer 52 powers the external power sub-circuit 51 by supplying 12–30 volts AC to the energizing apparatus 50. Adjusting the 12–30 volts power output of the VAC transformer 52 to the wire coil sets 22 controls invention's power output in relation to an external load against the invention 1. Fuses/circuit breakers 54 used in conjunction with the VAC transformer 52 protect the circuitry from electrical shorts, power spikes or other damaging electrical effects.

A bridge rectifier 53 converts the AC electrical power output from the VAC transformer 52 into the DC or direct current that powers the invention's electronic circuitry. The DC current created by the bridge rectifier 53 has some un-wanted pulse characteristics of AC current. In order to ameliorate or otherwise eliminate these unwanted AC type pulse characteristics, a capacitor 55, acting as a filter, attaches in parallel to the ground and power leads from the bridge rectifier 55.

Although the wire coil sets energizing circuitry 60 operate in a range from 12 to up to 30 volts DC, components of both the proximity detector sub-circuit 70 and the variable speed timing sub-circuit 80 require a non-variable 12 volt DC electrical current. The external power sub-circuit 51 has additional circuitry that supplies the necessary non-variable 12 volts DC. This additional circuitry is comprised of a resistor 56, a secondary capacitor 57 and a zener diode 58. The resistor 56 limits the incoming 12–30 DC volt electrical current from the external power sub-circuit 51 to 12 volts DC. The secondary capacitor 57 acts as a filter to eliminate/reduce any unwanted electronic noise/interference created by external power sub-circuit 51 or the energizing wire coil set sub-circuit(s) 60 that may feed into other circuitry.

The zener diode 58 acts as a safety valve, "dumping" any electrical current in excess of 12 volts into the ground of the external power sub-circuit 51 before it can be fed into and damage the proximity detection sub-circuit 70/variable speed timing sub-circuit 80. The zener diode 58 can accomplishes this purpose because it blocks the flow of electrical power in one direction (ground to power) while only allowing the passage of the current to the ground of the external power system if it exceeds 12 volts.

In the preferred embodiment, a VAC transformer 52 supplies both 12–30 volts for the wire coil set energizing sub-circuit 60 and the 12 volts constant for the proximity detection sub-circuit 70/variable speed timing sub-circuit 80. In other embodiments of the invention 1, there are separate power supplies for both the variable 12–30 DC volt power source and the constant 12 DC volt power source.

In various embodiments of the invention 1, sine/square wave audio generator replaces the 12–30 DC volt electrical power supply of the external power sub-circuit 51. A sine/square wave audio generator produces electrical signals similar to those produced by stereos to cause the solenoid in an audio speaker to operate. It does this by varying the voltage in the electrical current. When the electrical signal reaches the speaker, it causes an electrical wire coil set to move a permanent magnet attached to the speaker diaphragm. The movement of the permanent magnet, in relation to the voltage changes in the audio signal, moves the attached diaphragm to produce sound such as music. The electrical signals used in such energizing can be of a low amperage, allowing the invention 1 to be used in a greater variety of applications require a smaller output power source. In the preferred embodiment, a Model 3001, 20 Hz–150 kHz sine/square wave audio generator, from BK Precision, 1031 Segovia Circle, Placentia, Calif. 92870-7173 is used. A switch or gate allows such electrical signals to pass through the wire coil set(s) 22. This switch or gate, as known to those skilled in the art, would be selected to allow it to be incorporated into the wire coil set energizing sub-circuit 22.

The wire coil set energizing sub-circuits 60 are comprised of: 1) two connected Darlington arrays 61 which are used as a switch or gate to control the flow of electricity from the external power sub-circuit 51 through a wire coil set(s) 22; 2) an optic-isolator 62 which triggers the connected Darlington arrays 61 upon receiving an electrical signal from optical sensor switches 71 of the proximate detection sub-circuit 70; and 3) a Counter ElectroMotive Force or CEMF pathway 63 which directs any CEMF electricity back into the electrical output of the external power sub-circuit 51.

The optic isolator 62, NTE3043 Optic Isolator NPN by NTS Electronics, Inc., 44 Farrand Street, Bloomfield, N.J. 07003, is the initiating switch for the wire coil set energizing sub-circuit 60. In that same capacity, the optic isolator 62 also connects the wire coil set energizing sub-circuit 60 with the proximity detection sub-circuit 70 (or the variable speed timing sub-circuit 80).

The optic isolator 62 is comprised of two electrically isolated parts: a phototransistor connecting the electrical power to the Darlington array 61; and a LED (Light Emitting Diode) connected to the proximity detection sub-circuit 70/variable speed timing sub-circuit 80. When energized, the LED portion outwardly emits light, not electrical current, to activate the phototransistor portion of the optic isolator 62 which then allows the passage of the electrical current to the two Darlington arrays 61. Resistors attached to the optic isolator 62 drop the electrical current voltage to levels required by the optic isolator 62.

In operation, the activation of the proximity detection sub-circuit 70 closes or activates the LED circuit of the optic isolator 62 by causing the electrical current to pass through the LED circuit to the ground of the external power supply sub-circuit 51. Similarly for the electronic timer format of the energizing apparatus 50, when the variable speed timing sub-circuit 80 issues a timed electric signal to a respective wire coil set energizing sub-circuit 60, this action closes (activates) the LED circuit of the optic isolator 62 via a Hex Schmidt inverter 72.

The activation of the optic isolator 62 allows the electrical current to flow to one of the two Darlington arrays 61 connected in series. The Darlington array 61, NTE261 as provided by NTE Electronics, Inc., 44 Farrand Street, Bloomfield, N.J. 07003, is comprised of two transistors linked in series (e.g., one right after the other). The individual transistor, as used in the present embodiment of the invention 1, is essentially a solid-state switch/amplifier which upon the receipt of a weak electrical signal (such as that issued from the optic isolator 62) duplicates it as a much larger, more powerful signal. When the a weak signal from the optic isolator 61 activates the first transistor of the Darlington array 61, that first transistor sends out a duplicate stronger signal that is capable of activating the transistor next in line in the array. In this manner, the connected Darlington arrays 61 act in a "cascade" fashion to activate the final transistor in the series which is strong enough to handle the full 12–30 volt current that passes through the wire coil set 22. Upon activation, the final transistor allows the full 12–30 volt current from the wire coil set 22 to pass through the transistor to the ground of the external power sub-circuit 51.

The Darlington array 61, essentially a "Billy Goat's Gruff" setup of transistors, allows the use of less expensive, progressively stronger transistors in series (rather than a single, much more expensive transistor that is strong enough to handle a large electrical load energizing of a wire coil set 22) yet only be activated by a relatively weak electrical signal from the optic isolator 62. Resistors attached to the Darlington arrays 61 lower the electrical current to the proper levels required by the Darlington array 61 operations.

In between the wire coil set(s) 22 and the Darlington arrays 61 is the Counter Electro-motive force or CEMF connection 63 that is sandwiched between two diodes 64 and the respective wire coil set 22. The CEMF connection 63 ensures that any CEMF created by the wire coil set(s) 21 feeds unilaterally back to the power output of the external power sub-circuit 51. The diodes 64 also ensure that the output current from external power sub-circuit 51 cannot pass through the counter EMF connection 63 to bypass the wire coil set(s) 22. Failure to direct the CEMF or voltage spike to the power source, to another electrical circuit or otherwise grounded out, could result in the CEMF burning out the integrated circuitry in the energizing apparatus 50.

The proximity detection sub-circuit 70 is comprised of the optical sensor switches 71, a Hex Schmitt inverter 72, and a flywheel 43 with a mirror or polished portion 49.

In between the optical sensor switch 71 and the wire coil energizing sub-circuit (the LED portion of the optic isolator 62) is a Hex Schmitt inverter 72, SN74HC14 made by Texas Instruments, PO Box 65303, Dallas, Tex. 75265. The Hex Schmitt inverter 72 has at least two amplifier/inverters that connected to one another to amplify or increase the signal strength of the output power coming from the phototransistor portion of the optic isolator 62. The use of two amplifiers/inverters (each of which inverts the electrical signal) allows the second inverter to reverse or cancel out any signal inversion caused by the first amplifier/inverter. The Hex Schmitt inverter 72 in the present configuration boosts or strengthens the current that has passed though the LED portion of the optic isolator 62 to "push" it through the optical sensor switch 71 (phototransistor) which by its construction generally allows only for the passage of smaller electrical currents through it.

Alternate embodiments of the proximity detection format of the energizing apparatus 50 can provide for an adjustable individual dwell angle for each of the optical sensor switches 71/wire coil sets 22 using timing circuitry known to those versed in the art. Each optical sensor switch 71 has its own electronic timing circuitry with an adjustable timer and a reset function. The activation of the optical sensor switch 71 starts its electronic timing circuitry. When the electronic timing circuitry had reached its operator set time, it would disrupt the electrical connection between the optical sensor switch 71 and the wire coil set energizing sub-circuit 60 despite the continued activation of the optical sensor switch 71. The triggering of the other optical sensor switch 71 would activate the reset function of the adjustable timing circuitry for the first optical sensor switch 71 and vice versa. The reset function would reset the adjustable timer and reconnect the first optical sensor switch 71 to its respective wire coil set energizing sub-circuit 60.

As shown in FIG. 5, the second or electronic timer format of the energizing apparatus 50 is comprised of the variable speed timing sub-circuit 80 as well as the same external power source sub-circuit 51 and wire coil set energizing sub-circuit 70 found in the proximity detection version of the energizing apparatus 51.

The variable speed timing sub-circuit 80 used as an electronic timer circuit to control the wire coil set energizing sub-circuit 70. The variable speed timing sub-circuit 80 is comprised of three 555 type integrated circuits (IC), a flip-flop integrated circuit (IC) 83, two AND gate integrated circuits 84, and two amplifiers 85.

In the invention 1, the 555 IC (Integrated Circuit) is a multivibrator or an electronic timer configured to be astable or monostable. The astable configuration produces continuous train of electrical signals/pulses at any timing (frequency) that the operator requires. The name "astable" means never stable in that the output of the circuit never stays stable in one of the two states (i.e., it moves automatically between a high logic level state to a low logic level state (i.e., from being powered/on to being unpowered/off/grounded). The monostable configuration, on the other hand, means that 555 IC stays at one specific state until it is otherwise triggered or reset. This configuration allows the 555 IC to produce an electrical signal of a set duration/length in response to a specific triggering event and to be reset to be ready for the next triggering event.

The 555 IC has a "trigger" input for causing the 555 IC to send out its signal through its output and a "reset" input which causes the 555 IC to go back to its original state. When the 555 IC reset input is activated, the 555 IC trigger input cannot be activated and the 555 IC cannot issue its own signal. Because both the 55 IC trigger and reset inputs are low logic state "switches", the input must receive a constant electrical current of certain voltage and amperes in order to remain inactive. If that current is diverted (turned off) or otherwise reduced (i.e., grounded out) from the input, this triggers the 555 IC input (i.e., the reset input) causing the respective desired effect (i.e., the 555 IC reverts to its original logic state).

In the invention 1, one 555 IC is set in the astable configuration, the astable 555 IC 81, to act as an electronic timer to send out triggering signals at a frequency/rate set by the operator. This stream of triggering signals "drives" the speed or rate at which both the variable speed timing circuit 80 and the connected wire coil set energizing sub-circuit 60/the invention 1 runs or operates. An adjustable resistor 86 attached to the astable 555 IC 81 is a variable speed control to give the operator the ability to adjust the frequency or rate at which the astable 55 IC 81 sends through its output the triggering signal.

The output of the astable 555 IC 81 connects to the trigger input of the flip-flop IC 83. The flip-flop IC 83 has two complimentary outputs, when one output is in the high logic state (i.e. "powered", sending out an electrical signal) the other output is in low logic state ("unpowered", connected to the ground). When the flip-flop IC 83 receives at its trigger input the initial sharp distinctive portion of the astable 555 IC's 81 triggering signal, this activates the flip-flop IC 83 and causes its two outputs to switch or "flip-flop" logic states. Upon a succession of incoming triggering signals, the flip-flop IC 83 will correspondingly alternate between its two outputs as to which one sends out the flip-flop's own triggering electric signal and to which one connects to the ground of the external power sub-circuit 51.

Each flip-flop output is connected to: 1) an AND gate IC 84; 2) the reset input of the monostable 555 IC 82 whose output is also connected to the AND gate IC 84; and 3) the trigger input of the other monostable 555 IC 82. This cross connection allows the energized output of flip-flop IC 83 to send an electric signal to the AND gate IC 84 of the monostable 555 IC 82 that is to be activated. Simultaneously, the grounded input of flip-flop IC 83 activates the trigger input of the monostable 555 IC 82 that is to be activated causing that monostable 555 IC 82 to issue its adjustable time duration signal through its output to the connected AND gate IC 84. An operator adjustable resistor 87 attached to each monostable 555 IC 82 sets the duration (dwell angle) of its output signal. The AND gate IC 84, upon simultaneous receipt of the flip-flop signal and monostable 555 IC 82 adjustable time duration signal, lets the adjustable time duration signal pass onto the respective wire coil set energizing sub-circuit 60. The grounded input of flip-flop IC 83 also activates the reset input of the non-activated monostable 555 IC 82.

The activation of the reset input for a monostable 555 IC 82 cuts off adjustable time duration signal issued from the monostable 555 IC 82. This action prevents the activation of two wire coils sets energizing sub-circuits 22 at the same time if the operator has mistakenly set the dwell angle of a monostable 555 ICs 82 to be too long in duration with respect to the rate of frequency that the energizing apparatus 50 is operating.

The use of AND gate IC 84 ensures that the monostable 555 IC 82 connected to it is in the correct logic state upon activation of the energizing apparatus 51 and prevents a wrongful issuance of adjustable time duration signal (i.e., a "backfiring" of a monostable 555 ICs 82). The AND gate IC 84 accomplishes this by preventing the passage of adjustable time duration signal onto the respective wire coil energizing sub-circuit 22 unless the AND gate IC 84 simultaneously receives a properly timed electrical signal from the flip-flop IC 83 as well.

Once the AND gate IC 84 allows the adjustable time duration signal to pass through, the signal goes to an amplifier 85 in a Hex Schmitt inverter 72 that has both power and ground connections. This action grounds, completes, or otherwise activates the LED circuit of the optic isolator 62 resulting in a series of events, as described above, that energizes the respective wire coil set(s) 22.

The variable speed timing sub-circuit 80 embodiment of the invention 1 additionally has centering magnets 88 located by the insulated collar 27. In the preferred embodiment, the centering magnets are located between the wire coils and exterior of the tube 23/spool 24. The magnetic field of these centering magnets 88 would locate the magnetic object 14 (payload 12/piston 21) within the center of the magnetic object's travel within the solenoid when the invention 1 is at rest/non-operational. The inventor has found that if the magnetic object 14 (piston 21/payload 12) is not so centrally located upon startup, the magnetic object 14 (piston 21/payload 12) will not be properly propelled into its reciprocal motion upon start up of the invention 1.

The invention 1 also features at least one propulsion magnet(s) 90 made from rare earth metal(s) that is adjustably held in close proximity to at least one end of the tube 23, but does not contact the multiple wire coil set solenoid 20 or the magnetic object 14. The propulsion magnet(s) 90 can be adjusted manually to a position close to the multiple wire coil set solenoid 20 to provide optimal operational speed of the piston 21/payload 12. A variety methods known to those versed in the art provides the means for accomplishing this adjustment. The invention 1 utilizes a bolt 91 attached to the top of the disc-shaped rare earth permanent propulsion magnet 90. The propulsion magnet(s) 90 is suspended beneath a portion of the framework 11 so the propulsion magnet(s) 90 is located near, but not in contact with, the multiple wire coil set solenoid 20 or the magnetic object 14. The threaded portion of the bolt 91 reversibly engages a threaded aperture in the previously mentioned portion of the framework 11. In this manner, the operator, by rotating the propulsion magnet(s) 90, can adjust the proximity of the propulsion magnet(s) 90 to multiple wire coil set solenoid 20 or magnetic object 14.

Alternately, servos connecting the propulsion magnet(s) 90 to the framework 11 electronically position the propulsion magnet(s) 90. Circuitry known by those versed in the art would control the servos action in response to signals from sensors monitoring operational characteristics of the invention 1. In response to said signals, the circuitry would then simultaneously activate servos to move the propulsion magnet (s) 90 towards its optimal position relative to the multiple wire coil set solenoid 20.

Although not shown in FIG. 4 or 5 (the circuitry drawings of the energizing apparatus 50), the energizing apparatus 50 can "skip" energize certain wire coil set(s) at select times. The operator implements this skip energize operational mode when the invention 1 is operating at a certain speed, power output and load to selectively to prevent energizing of a specific wire coil set(s) that should other wise be energized at that time. This skip energizing substitutes the momentum of the mass of the invention's moving parts [magnetic object 14 and/or conversion mechanism 40] for electrical energy/current supplied by the outside power source of the external energy sub-circuit 51.

The electronic circuitry for the skip energizing operations would have the energizing apparatus 50 not energize (either alternatively or constantly) specific wire coil sets 22 at specific times during an operation cycle when they normally would be energized. The exact setup for this skip energizing would depend on the specific embodiment of the invention 1 (e.g., single multiple wire coil solenoid or multiple solenoids arranged in-line, in banks or radial orientation, etc) so that there would be sufficient output power generated to maintain the desired power output of the invention 1.

The energizing apparatus 50, in a manner known to those skilled in the art, would be connected to a CPU or computer with imbedded software monitoring the invention's operating conditions and according to preset and/or operator adjustable parameters to timely block the energizing of specific wire coil sets 22 despite the activation of the wire coil set energizing sub-circuits 60 controlling those wire coil sets 22. The CPU or computer would have sensors in place on the invention 1 to inform it if they detected a presence of an external load placed upon the invention 1 that had superseded the power output of the invention 1 during skip energizing. The CPU in response to this information would then cause the energizing apparatus 50 to revert from the skip energizing to the full energizing mode for increased power output. Once the CPU, through its sensors, detects that there is sufficient reduction of the external load upon the invention 1 to allow the recommencement of the skip energizing, the CPU would again begin to block at specific times the energizing of specific wire coil sets 22. The skip energizing operational mode allows the invention 1 to become more energy efficient.

Figure 6:
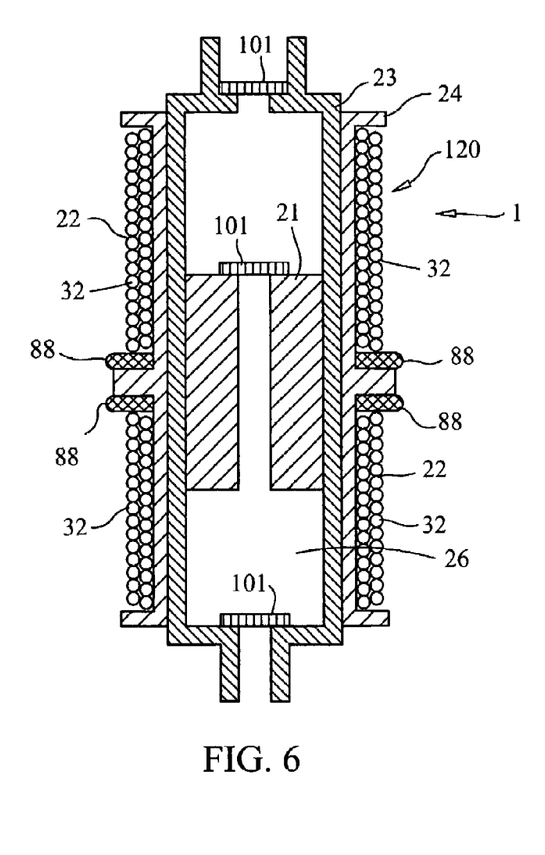
FIG. 6 A side elevation cutaway drawing of the solenoid pump embodiment of the invention.

Another embodiment of the invention 1 is the solenoid pump which can be either a reciprocal piston pump or a toroidal (donut-shaped) pump. In either embodiment, the pump 100 is comprised of a tube 23 (cylinder with two enclosed ends or an enclosed toroidal cylinder) containing at least one magnetic object 14, namely a piston 21, and at least one multiple wire coil set solenoid 20 wrapped around at least a portion of the exterior of the tube 23. The tube 23 has at least one set of inlet/outlet valves that connect to the tube interior 26. The toroidal pump embodiment can utilize multiple pistons 21 and solenoids to propel the piston(s) 21 within the tube 23.

The energizing apparatus 50 is used with the solenoid pump 100 to propel a piston 21 in reciprocal fashion (tube with two enclosed ends) or in a unilateral direction (toroidal tube). The reciprocal piston solenoid pump 100 uses the electronic timer format of the energizing apparatus 50 to propel the piston 21. This embodiment also utilizes centering magnets 88 in the multiple wire coil set solenoid 20 to centralize the piston 21 relative to the multiple wire coil set solenoid 20 for the proper start up of the propulsion of the piston 21 when the energizing apparatus 50 starts up.

In another embodiment of the reciprocal piston solenoid pump, the pump 100 uses optical sensor switches 71 as the proximity detectors. These optical sensor switches 71 can be placed on or near each end of the tube 23. The manner in which the optical sensor switches 71 are attached to the tube 23 allows the optical sensor switches 71 to be activated from light presented into tube's interior 26. The piston 21 can have a highly reflective or polished surface on a portion of each piston end that can reflect light from the optical sensor switch's light source as the piston 21 approaches the end of the tube 23. The optical sensor switch 71 can be electronically controlled/physically moved and its light source strength also adjusted so that the amount of reflective light received by the optical sensor switch 71 by the piston's reflection will match the point where the optical sensor switch 71 should be activated to cause proper energizing of the respective wire coil set(s) 22.

In alternative embodiments of the invention 1, the optical sensor switch 71 and light source with connections to the tube interior 26 are on the opposite sides of the tube 23. When the piston 21 comes towards the end of the tube 23, the body of the piston 21 would block the light source and trigger the optical sensor switch 71. The activating light source could also be mounted together with the optical sensor switch 71 and be reflected by a polished/reflective surface on the other side of the tube interior 23 or by a reflective surface on the side of the piston 21 adjacent to the position of the optical sensor switch 71. Limiting factors restricting the use of a proximity detection format of the energizing apparatus 50 would be the presence in the tube interior 26 of any opaque gas or liquid that would absorb the activating light. In such instances, the electronic timer format of the energizing apparatus 50 would replace the proximity detection format.

The pump embodiment of the invention 1 would utilize means described above to divert counter EMF to the pump's power supply. This diversion is most useful to smaller pump applications, such as an internal cardiac or heart pump which relies on a fixed portable energy source/power supply such as a battery. The invention 1 would allow the solenoid pump 100 to run longer and more efficiently on the smaller power supply. The use of a solenoid pump 100 in combination with the energy efficient energizing control system 13 would allow the cardiac version of the solenoid pump 100 to be smaller yet more powerful than those currently offered would.

As described above, the performance of solenoid pump 100 can also be enhanced by the propulsion magnet 90 that is located near but not in direct contact with the multiple wire coil set solenoid(s) 20/piston(s) 12. The location of the propulsion magnet 90 could be adjustable or fixed. If adjustable, mechanical or electronic means or a combination of both, as known those skilled in the art, would position the propulsion magnet 90.

Figure 7:
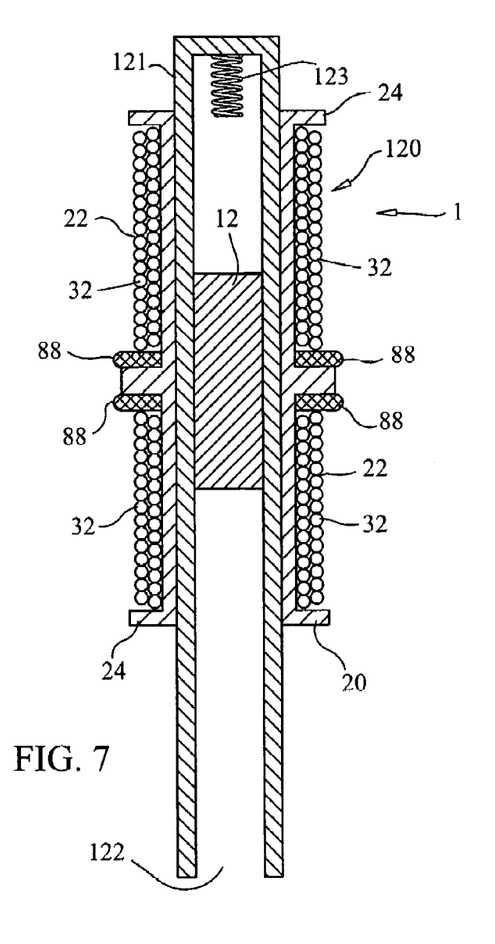
FIG. 7 A side elevation cutaway drawing of the payload delivery system embodiment of the invention.

As shown in FIG. 6, the payload delivery system embodiment of the invention, generally denoted by numeral 120, is comprised of 1) a tube 23 with at least one open end or muzzle 121; 2) a multiple wire coil solenoid set 20 wrapped around the tube 23 closer to the breech 122 (enclosed end) of the tube 23; 3) a magnetic object 14, namely a payload 12 with magnetic or polar properties; and an energizing apparatus 50. Within the tube interior 26 by the breach 122 is a spring 123 that rebounds the payload 12 towards the muzzle 121 should the energizing apparatus 50 fail.

The wire coil sets 22 of payload delivery system 120 connect to the energizing apparatus 50. In the preferred embodiment, the sensors for proximity detection are optical sensor switches 71 (phototransistors) which are placed so the optical sensor switches 71 can detect within the tube interior when the payload 12 has approached an end point of its reciprocal travel.

In embodiment of the payload delivery system 120 that uses the electronic timer format of the energizing apparatus 50, centering magnets 88 centralize the payload 12 relative to the multiple wire coil set solenoid 20. As denoted above, after activating, the electronic timer energizing apparatus 50 drives the payload 12 in a reciprocal fashion. The dwell angles are individually set to prevent centering the payload 12 at speed. The dwell angle of one wire coil set 22 is slightly different from the other wire coil set 22 without greatly upsetting the reciprocal motion of the propelled payload 12.

A trigger switch, whose circuitry is designed in a manner known to those who have skill in the art, is built into the energizing apparatus 50 so when the trigger switch is activated, it causes the energizing apparatus 50 to activate the muzzle oriented wire coil set 22 in sequence for the proper duration (dwell angle) and then ensures both wire coil sets 22 are both simultaneously de-energized. This action causes the payload 21 to be attracted to the muzzle oriented wire coil set 22, and with no magnetic force from the breech end wire coil set 22 to restrain it, the payload 12 travels down the tube 23 and out the muzzle 122 to be unilaterally and completely expelled from tube 23.

In operation, the magnetic object or payload 12 enters the muzzle 121 into the tube's interior 26 where the centering magnets 88 would locate the payload 12 within the midpoint of its reciprocal movement or travel. The electronic timer version of the energizing apparatus 50 starts the payload's 12 reciprocal movement with the tube's interior 26 by the alternate energizing of the wire coils sets 22 of the multiple wire coil set solenoid 20. The activation of the trigger switch would cause energizing apparatus 50 to the energize the muzzle wire coil set 22 in sequence then de-energize of all the wire coils sets 22. The inventor believes, without impacting the patentability of this invention 1, that this action causes the payload 21 to be attracted to the muzzle end wire coil set 22 where the payload's built up kinetic energy unrestrained by a magnetic field, completely projects the payload 12 out of the invention 1.

An alternate payload delivery system embodiment of the invention 1 is an atomic accelerator with extremely powerful wire coil sets 22; a similarly powerful external power source; and an energizing apparatus 50 to use reciprocal motion operating at ultrahigh frequency to breakdown subjected materials into their subatomic components. The magnetic object 14 would include atoms or atomic particles that have a charge or are otherwise polarized (i.e., positively charged protons). The use of the independent dwell angle control and unilateral energization would reduce the limiting effect of inherent wire resistance and improve the strength of the magnetic force as used at ultrahigh speeds. A major limiting factor to the operating capacity of this embodiment would the speed/frequency of energizing apparatus 51, which is set by the speed of the integrated computer chip used as the electronic timer used in the energizing apparatus 50.

While the above descriptions of the above embodiments applies to motors, pumps and payload delivery systems, the invention 1 can also be applied to other devices that use solenoids/inducers.

While the above descriptions directly describe the above embodiments, it is further understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative.

We claim as our invention:

1. A solenoid-based propulsion system comprising:
   A) at least one multiple wire coil set solenoid;
   B) a magnetic object, at least a portion of which reciprocally moves within the multiple wire coil set solenoid;
   D) an energizing control system connected to multiple wire coil sets of the solenoid that controls the time duration for energizing each wire coil set;
   E) wherein the multiple wire coil set solenoid has an opened ended tube through which the magnetic object may be unilaterally and completely propelled out of tube when at least one wire coil set is de-energized.

2. A solenoid-based propulsion system of claim 1 wherein the time duration for the energizing each wire coil set of the multiple wire coil set solenoid is adjustable.

3. A solenoid-based propulsion system of claim 1 wherein the time duration for energizing a wire coil is different for each wire coil set of a multiple wire coil set solenoid.

4. A solenoid-based propulsion system of claim 1 wherein the energizing control system further comprises of an electronic timer to coordinate the energizing of the wire coil sets.

5. A solenoid-based propulsion system of claim 1, wherein the energizing control system skip energizes selected wire coil sets at selected times.

6. A solenoid-based propulsion system of claim 1, wherein the wire coil set closest to the open end of the tube is the last to be de-energized.

7. A solenoid-based propulsion system of claim 1 wherein the one multiple wire coil set solenoid contains a centering magnet.

8. A solenoid-based propulsion system of claim 1 wherein the energizing control system further comprises of an sine/square wave generator that energizes the wire coil sets.

9. A solenoid-based propulsion system comprising:
   A) at least one tube with an exterior and an interior;
   B) multiple wire coil sets wrapped around the exterior of the tube;

C) a magnetic object which reciprocally moves within at least a portion of the interior of the tube; and D) an energy control system connects to wire coil sets of the multiple wire coil set solenoid that skip energizes select wire coil sets at selected times, the energy control system further comprises of a sine/square audio signal generator that energizes the wire coil sets.

10. A solenoid-based propulsion system of claim 9, wherein the energy control system controls the time duration for wire coil sets.

11. A solenoid-based propulsion system of claim 9, wherein water and air tight compartments contain the energizing control system and wire coil sets while the interior of the tube and the magnetic object connected to a conversion mechanism are vented to the outside atmosphere.

12. A methodology for operating a solenoid-based propulsion system comprising:

A) placing a magnetic object inside an open ended tube that has at least one multiple wire coil solenoid wrapped round its exterior;

B) centering the magnetic object within the midpoint of its reciprocal movement

C) alternatively energizing the wire coil sets of the multiple wire coil solenoid;

D) reciprocally moving the magnetic object in a within at least portion of the tube, and E) stopping the reciprocal movement of the magnetic object to propel the magnetic object irreversibly and completely out of the open ended tube.

13. A methodology for solenoid-based propulsion of claim 12 activating of a trigger switch to unilaterally propel the magnetic object totally out through the open end of the tube.

14. A methodology for solenoid-based propulsion of claim 12 further comprising activating a sine/square wave audio generator.

15. A methodology for solenoid-based propulsion of claim 12 further comprising adjusting the propulsion magnet.

16. A methodology for solenoid-based propulsion of claim 12 further comprising adjusting the time duration for the energizing of the wire coil sets.

* * * * *